United States Patent [19]

Williams

[11] Patent Number: 5,277,745
[45] Date of Patent: Jan. 11, 1994

[54] SEVER AND SEAL BAR HAVING INTERCHANGEABLE INSERTS AND BLADES

[75] Inventor: Jerry L. Williams, Chesterfield County, Va.

[73] Assignee: Reynolds Metals Company, Richmond, Va.

[21] Appl. No.: 970,507

[22] Filed: Nov. 2, 1992

Related U.S. Application Data

[63] Continuation-in-part of Ser. No. 799,234, Nov. 27, 1991.

[51] Int. Cl.$^5$ .............................................. B32B 31/00
[52] U.S. Cl. ........................... 156/583.1; 156/583.4; 156/515; 53/477; 53/374.8; 53/373.7; 53/373.5
[58] Field of Search .................. 156/583.1, 583.4, 515; 53/477, 374.8, 373.7, 373.5

[56] References Cited

U.S. PATENT DOCUMENTS

| | | | |
|---|---|---|---|
| 2,651,350 | 9/1953 | Casey | 156/583.4 |
| 3,940,305 | 2/1976 | Stenberg | 53/553 |
| 4,079,570 | 3/1978 | Rucker | 156/583.4 |
| 4,630,429 | 2/1985 | Christine | 53/479 |
| 4,767,482 | 8/1988 | Diez | 156/515 |
| 4,807,426 | 2/1989 | Smith | 53/552 |
| 4,949,846 | 8/1990 | Lakey | 156/515 |
| 4,965,985 | 10/1990 | Masubuchi | 53/374.8 |
| 5,056,295 | 10/1991 | Williams | 53/373.7 |
| 5,131,213 | 7/1992 | Shanklin | 156/515 |

FOREIGN PATENT DOCUMENTS

| | | | |
|---|---|---|---|
| 0755543 | 10/1970 | Belgium | 156/583.1 |
| 2230090 | 1/1974 | Fed. Rep. of Germany | 156/583.1 |
| 2845271 | 10/1978 | Fed. Rep. of Germany | 156/583.1 |
| 0010668 | 1/1978 | Japan | 156/583.1 |

*Primary Examiner*—David A. Simmons
*Assistant Examiner*—Mark DeSimone
*Attorney, Agent, or Firm*—Alan T. McDonald

[57] ABSTRACT

A heat seal bar used in a plastic film packaging machine for cutting and sealing plastic films about wrapped products is provided with an insert having sealing surfaces and a knife cutting edge which is removably mounted to the seal bar. A first rectangular portion of the insert is adapted to be received within an elongate slot formed in a bottom surface of the seal bar for mounting the insert to the bar with screws. A second portion of semicircular cross section extends along the bottom of the first portion and thereby projects downwardly from the seal bar. A knife blade detachably mounted in the insert has a cutting edge extending below the seal bar. The cutting edge is defined by a pair of converging knife surfaces formed on the knife blade. Convex surfaces of the second portion formed respectively on opposite sides of the knife define the sealing surfaces.

19 Claims, 1 Drawing Sheet

SEVER AND SEAL BAR HAVING INTERCHANGEABLE INSERTS AND BLADES

CROSS REFERENCE TO RELATED APPLICATIONS

This is a continuation-in-part of U.S. Application Ser. No. 07/799,234, filed Nov. 27, 1991.

1. Technical Field

The present invention relates generally to seal bars used in the flexible packaging industry and, more particularly, to a cutting and sealing element used in a shrink film wrapping machine.

2. Background Art

Seal bars are commonly used in the flexible packaging industry to cut and seal polyolefin films and PVC films around articles such as consumer goods, industrial items and food products. Known seal bars in shrink film machines of which I am aware generally utilize a hot knife type of seal bar for cutting and sealing the shrink film. This hot knife type of arrangement includes a metal bar, usually aluminum, having a heating element inserted within the bar and a heat sensing device (e.g. a thermocouple, thermistor, etc.) with a temperature controller maintaining the bar at sealing temperature. A single blade is typically mounted to the metal bar in a longitudinal slot formed in a lower surface thereof. The single blade includes a pair of blade surfaces terminating in a cutting edge.

In use, the seal bar is pivotally mounted to a machine frame of a wrapping machine and descends into contact with a continuous ribbon of plastic film which has been wrapped around and extends between adjacent articles being packaged in a known manner. The film is cut with the cutting edge of the blade and portions of the film located on opposite sides of the cutting edge and adjacent thereto are sealed with the convergent surfaces of the blade which define the cutting edge. Counter pressure is provided for the blade with a firm, heat resistant material (e.g., rubber pad wrapped with Teflon tape).

The foregoing known arrangement works well for most polyolefin films but does not work well with PVC films due to the higher temperatures required to cut and seal PVC film and also the tendency of PVC films to stick to the high temperature knife surfaces on each side of the knife cutting edge during the cutting process.

It is accordingly one object of the present invention to provide a hot knife insert within a shrink film wrapping machine that may be used to reliably cut different types of plastic films such as polyolefin films and including PVC films, without having the PVC film stick to the cutting edge surfaces.

Another object is to provide a removable insert which replaces the prior art single blade and thereby provides an arrangement having a removable sharper hardened steel knife cutting edge positioned therein and sealing surfaces formed thereon separate from the knife, i.e., adjacent the convergent sides of the blade forming the cutting edge.

Another object is to provide a removable cutting and sealing insert wherein, by virtue of separating the cutting function from the sealing function, the cutting blade blade may be sharper than previously possible, thus enabling cutting and sealing at a lower temperature than previously possible to further prevent sticking of the film being cut and sealed during the sealing process.

SUMMARY OF THE INVENTION

The present invention is directed to an improvement in a packaging apparatus for sealing and separating plastic films. The apparatus includes a metal seal bar having a heating means for heating a knife blade attached to the bar. The blade is adapted to cut the plastic films against the bias of a counter pressure element positionable beneath the film. The improvement comprises a removable insert mounted to the seal bar. The insert includes a removable knife blade having converging surfaces forming a cutting edge and the insert further includes sealing surfaces, formed adjacent the cutting edge, to effect low temperature sealing of the films cut with the cutting edge.

The insert has a mounting portion of generally rectangular cross section and a sealing portion formed with sealing surfaces at one end of the mounting portion. The mounting portion extends between a pair of generally parallel vertical sidewalls respectively terminating, at a lower end thereof, in a pair of ledges projecting generally perpendicular from the sidewalls. The sealing surfaces respectively curve convexly downwardly from the outermost ends of the ledges towards the knife blade which projects downwardly from the sealing surfaces or may angle inwardly from the outermost ends of the ledges toward the knife blade and include a convex curve portion adjacent the knife blade.

The seal bar is formed with an elongate mounting slot opening into a bottom surface thereof to receive the mounting portion of the removable insert of corresponding cross section. The ledges nest against portions of the bottom surface extending along opposite sides of the slot. Screws extend through the seal bar into the mounting portion to removably secure the insert in the slot of the bar. The heating means may include a heating element extending longitudinally through the bar adjacent the insert.

In accordance with another feature of the invention, the sealing surfaces may be provided with a release coating to prevent sticking of the plastic films thereto during the sealing process.

The insert has an elongate slot extending longitudinally within the mounting portion and opening downwardly in communication with a bottom surface of the sealing portion to receive the knife blade. The knife blade itself is thereby removably mounted within the insert for repair or replacement.

The sealing portion may be of semicircular cross section the diameter of which is coextensive with the ledges to provide a convex sealing surface or may angle inwardly from the ledges towards the knife blade and include convex portions adjacent the knife blade. Thus, the sealing surfaces are convex surfaces.

A method of sealing and separating plastic films after it is wrapped around a product in a plastic film packaging machine is also disclosed. The method comprises the steps of removably mounting an insert containing a removably mounted knife and sealing surfaces to a heat seal bar in the machine. The heat seal bar is then moved to direct the knife cutting edge into contact with the films. The films are cut with the cutting edge as the cutting edge and converging surfaces on the knife blade forming the cutting edge continue to move through the cut films. As this occurs, portions of the films extending adjacent and on opposite sides of the cut are sealed by contacting the portions with heated convex sealing surfaces formed on the insert respectively adjacent the knife blade converging surfaces.

In accordance with another feature of the method, sealing occurs by contacting the films with convex sealing surfaces that have been treated with a release coating, thereby preventing sticking of the films to the surfaces.

BEST MODE FOR CARRYING OUT THE INVENTION

Figure 1:
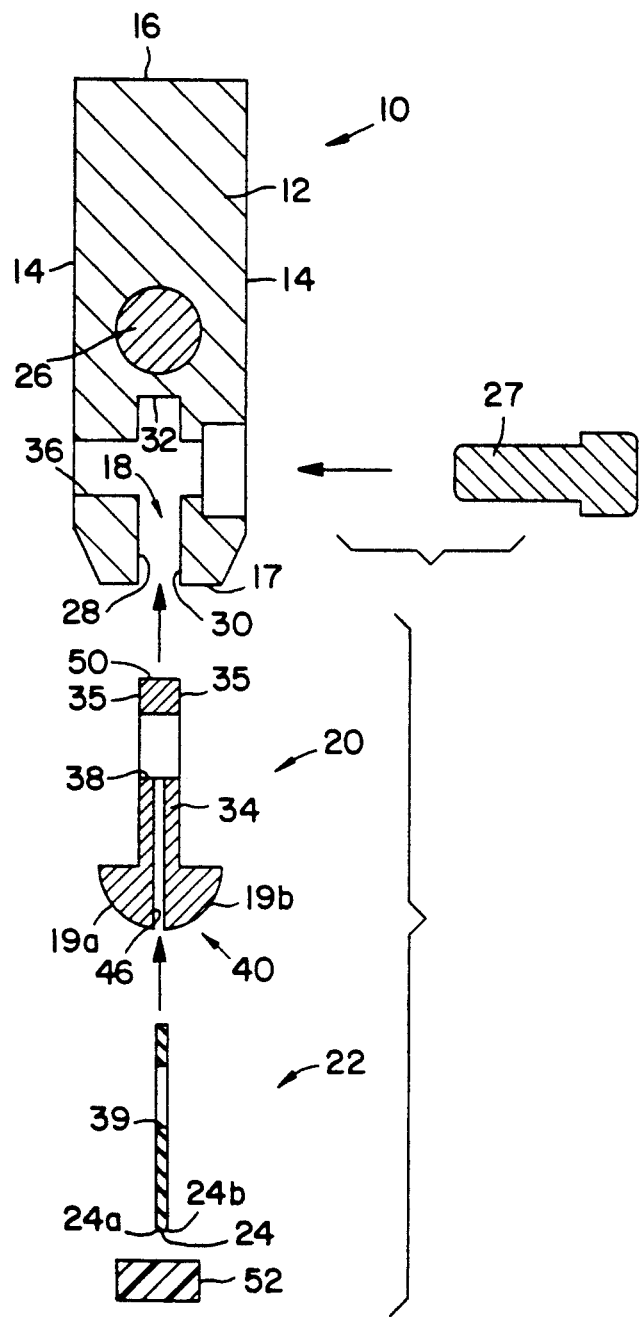
FIG. 1 is an exploded cross-sectional view of a seal bar, a removable insert, and a removable knife blade in accordance with the present invention, illustrating the assembly thereof.
Figure 2:
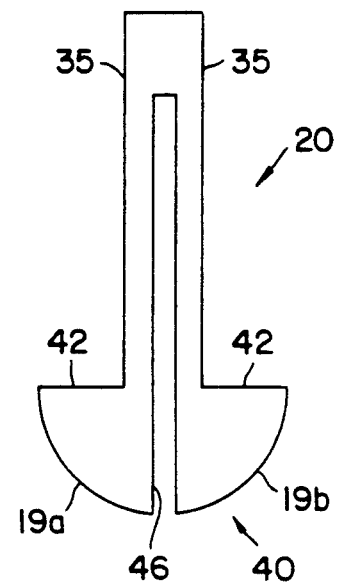
FIG. 2 is an end view of a first embodiment of a removable insert according to the present invention.

Referring to FIGS. 1 and 2, seal bar 10 comprises a seal bar body 12 of generally rectangular cross section having a pair of parallel sidewalls 14 connected by a top wall 16 and a bottom wall 17. A mounting slot 18 extends longitudinally through the seal bar 10 in open communication with the bottom wall 17 to receive an insert 20 containing, in accordance with the unique features of the invention discussed more fully below, a removably mounted cutting knife 22 having a cutting edge 24 projecting downward below convex surfaces of the insert 20 which define sealing surfaces 19a and 19b. A temperature sensor (not shown) is contained within the seal bar 10 and a heating element 26 extending through the seal bar are connected to an external temperature controller (also not shown) connected to a power source (also not shown) in a known manner. In mounted position, the sealing surfaces 19a and 19b and cutting edge 24 are heated by the heating element 26 through the body of the seal bar 10 and insert 20. By forming the sealing surfaces 19a and 19b separate from the converging knife surfaces 24a and 24b forming the cutting edge 24, the cutting edge can be sharper and the temperature of the sealing surfaces 19a and 19b and the knife surfaces 24a and 24b reduced to enable low temperature sealing to occur without sticking of the plastic films to either the knife or sealing surfaces.

More specifically, the mounting slot 18 is formed with a pair of parallel sidewalls 28 and 30 and a top wall 32 defining the uppermost extent of the slot. The mounting slot 18 is thereby of rectangular cross section corresponding to the rectangular cross section of a mounting portion 34 of the insert 20 received in the slot 18. This mounting portion 34 has parallel sidewalls 35 and is secured to the seal bar 10 with screws 37 extending through aligned and threaded holes 36 and 38 respectively formed in the seal bar body 10 and mounting portion 34 of the insert 20.

As mentioned above, the insert 20 further comprises an elongate, enlarged sealing portion 40 of semicircular or other convex cross-section extending along the bottom of the mounting portion 34. This sealing portion 40 is formed with a pair of upward facing horizontal ledges 42 respectively extending perpendicular and outwardly from the lower edge of the sidewalls 35 of the mounting portion 34. The sealing surfaces 19a and 19b are a pair of convex surfaces respectively extending downwardly from the outermost edge of the ledges 42 towards the knife blade 22 which projects downwardly from the lowermost ends of the sealing surfaces. In cross-section, the insert 20 is thus of an inverted mushroom shape.

The knife blade 22 is removably mounted within an elongate slot 46 extending vertically through the mounting and sealing portions 34 and 40 in open communication with the sealing surfaces 19a and 19b. When assembled, opening 39 in knife blade 22 is aligned with openings 38 of the removable insert 20 and 36 of the seal bar 10 and removably mounted by screws 37.

The knife cutting edge 24 is defined by a pair of converging knife surfaces 24a and 24b. The converging surfaces and cutting edge are spaced downwardly from the sealing surfaces 19a and 19b.

In operation, the mounting portion 34 of the insert 20 is received in the mounting slot 18 of the seal bar 10, the knife blade is received in the mounting slot 46 of the insert and the assembly is secured with the screws 37. The sidewalls 35 of the mounting portion 34 and the upward facing surfaces of the ledges 42 (defining the uppermost extent of the sealing portion 40) are in respective thermal contact with the sidewalls 28 and 30 of the mounting slot 18 and the bottom surfaces 17 of the seal bar 10. Optionally, the top wall 50 of the mounting portion 34 may be in thermal contact with the top wall 32 of the mounting slot 18. In this manner, heat from the heating element 26 is transmitted through the seal bar body 10 to the sealing surfaces 19a and 19b and knife cutting edge 24 in the insert 20.

The seal bar 10 is pivotally or otherwise conventionally secured to a known wrapping machine and is brought into a sealing position, using known manual or automatic means, whereupon the packaging material such as shrink films is clamped between the convex sealing surfaces 19a and 19b and a flexible seal pad 52 acting as a counter-pressure element. The cutting edge 24 initially cuts the shrink film. As the cutting edge 24 and the converging knife surfaces 24a and 24b descend through the cut, the convex sealing surfaces 19a and 19b respectively contact the overlapping portions of the shrink film to fuse same together on either side of the cutting knife 22.

Numerous advantages result from the insert 20 of the present invention. For example, the feature of separating the sealing surfaces 19a and 19b from knife surfaces 24a and 24b forming the cutting edge 24 enables the cutting edge to be sharper than those of the prior art while allowing the sealing surfaces 19a and 19b to be of larger area to thereby seal the plastic films at lower temperatures (e.g., about 300° F.) and provide a stronger seal. Preferably, the insert 20 (i.e., the sealing surfaces 19a and 19b and/or the cutting edge 24) should also be provided with a release coating (not shown) to prevent sticking of the plastic layers. Since the sealing surfaces 19a and 19b seal at a lower temperature as mentioned above, the insert 20 may utilize less electrical energy during heating and there is no smoke or residue buildup. Also, no Teflon tape is required on the counter-pressure element (seal pad 52) and very little down time is required for installation of the insert 20. The insert 20 is also inexpensive to replace and easy to install.

In addition, the removability of knife blade 22 permits replacement of only the knife blade 22 when it is in need of sharpening or replacement. This is in contrast to prior systems in which either the entire insert or the entire seal bar required replacement when only the knife blade was damaged.

Figure 3:
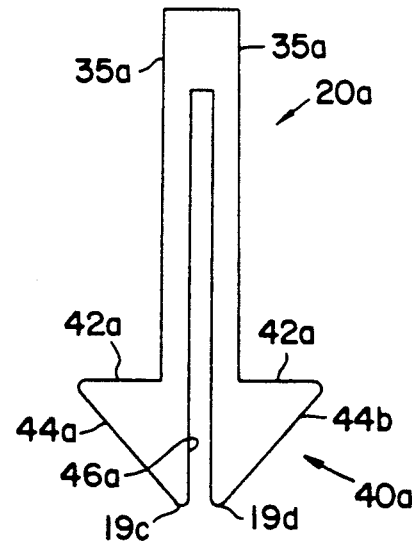
FIG. 3 is an end view of a second embodiment of a removable insert according to the present invention.

FIG. 3 illustrates a second embodiment for the removable insert. In this embodiment, the insert 20a includes ledges 42a. Extending inwardly from the ledges 42a towards slot 46a (and thereby knife surfaces 24a and 24b when assembled) are surfaces 44a and 44b. These surfaces 44a and 44b include convex portions 19c and 19d respectively adjacent slot 46a (and thereby knife surfaces 24a and 24b), thus providing convex sealing surfaces for the film as in the previous embodiment. In cross-section the insert of this embodiment is thus an arrowhead shape.

While there has been described and illustrated specific embodiments of the invention, it will be clear that variations in the details of the embodiments specifically illustrated and described may be made without departing from the true spirit and scope of the invention as defined in the appended claims.

I claim:

1. In a packaging apparatus for cutting and sealing plastic films, said apparatus including a metal seal bar having a heating means positioned therein for heating an insert and knife assembly removably attached to said seal bar, wherein said knife is adapted to cut said plastic films against the bias of a counter pressure-pressure element positionable beneath said films, the improvement comprising removable insert and means for mounting one of said insert to said seal bar at a time, said inserts being adapted to removably receive a knife blade having converging surfaces forming a cutting edge and sad inserts providing varying sealing surfaces for said seal insert formed adjacent the converging surfaces of said knife blade to effect sealing of the plastic films cut with the cutting edge.

2. The apparatus of claim 1, wherein said insert is inverted mushroom shaped in cross-section and the cutting edge extends downwardly from an enlarged section of the insert, said sealing surfaces being a pair of convex surfaces extending away from the cutting edge.

3. The apparatus of claim 1, wherein said insert has a first portion of generally rectangular cross section and a second portion formed at one end of the first portion and having said sealing surfaces, said first portion extending between a pair of generally parallel sidewalls respectively terminating in a pair of ledges extending generally perpendicular to the sidewalls, said sealing surfaces respectively extending downwardly from the outermost ends of said ledges towards the knife blade which projects downwardly from the sealing surfaces.

4. The apparatus of claim 3, wherein said seal bar is formed with an elongate mounting slot opening into a bottom surface thereof to receive the first portion of the insert of corresponding cross section, said ledges being disposed against portions of the bottom surface extending along opposite sides of the slot.

5. The apparatus of claim 4, wherein said mounting means includes screws extending through the seal bar into the first portion to secure the insert in the slot.

6. The apparatus of claim 5, wherein said heating means is a heating element extending through the bar adjacent the insert.

7. The apparatus of claim 1, wherein said sealing surfaces include a release coating to prevent sticking of the films to said sealing surfaces.

8. The apparatus of claim 3, wherein said insert has an elongate slot extending through the first portion and opening downwardly in a bottom surface of the second portion to receive the knife blade.

9. The apparatus of claim 1, wherein said insert is arrow shaped in cross-section and the cutting edge extends downwardly from an enlarged section of the insert, said sealing surfaces being a pair of convex surfaces extending away from the cutting edge and connected to portions extending inwardly from ledges formed as a portion of said arrow shape.

10. In the apparatus of claim 3, wherein said second portion is of semicircular cross section the diameter of which is coextensive with the ledges, said sealing surfaces thereby being convex surfaces.

11. A method of cutting and sealing plastic films after they are wrapped around a product in a plastic film packaging machine, comprising the steps of:
   a. mounting one of a series of removable inserts containing a removably mounted knife blade having a cutting edge and containing heated convex sealing surfaces to a heat seal bar within the machine, said inserts forming varying sealing surfaces for the seal bar, the seal bar having means for heating mounted therein;
   b. moving the heat seal bar into contact with the plastic films;
   c. cutting the plastic films with the cutting edge and continuing to move the cutting edge and converging surfaces on the knife blade forming the cutting edge through the cut plastic films; and
   d. sealing portions of the plastic films together extending adjacent and opposite sides of the cut by contacting said portions with said heated convex sealing surfaces of said insert formed respectively adjacent said converging surfaces.

12. The method of claim 11, wherein sealing occurs by contacting the plastic films with convex sealing surfaces which have been treated with a release coating.

13. An removable insert for detachably mounting to a heat seal bar in a packaging apparatus for sealing and separating plastic films which have been wrapped around a product, said insert comprising an insert body for removably receiving a knife blade having converging surfaces forming a cutting edge and said insert having convex sealing surfaces formed adjacent the converging surfaces to effect sealing of the plastic films cut with the cutting edge.

14. The insert of claim 13, wherein said insert is inverted mushroom shaped in cross-section and the cutting edge extends downwardly from an enlarged section of the insert, said sealing surfaces being a pair of convex surfaces extending away from the cutting edge.

15. The insert of claim 13, wherein said insert has a first portion of generally rectangular cross section and a second portion formed at one end of the first portion and having said sealing surfaces, said first portion extending between a pair of generally parallel sidewalls respectively terminating in a pair of ledges extending generally perpendicular to the sidewalls, said sealing surfaces respectively extending downwardly from the outermost ends of said ledges towards the knife blade which projects downwardly from the sealing surfaces.

16. The insert of claim 13, wherein said sealing surfaces include a release coating to prevent sticking of the films to said sealing surfaces.

17. The insert of claim 15, wherein said insert has an elongate slot extending through the first portion and opening downwardly in a bottom surface of the second portion to receive the knife blade.

18. The insert of claim 13, wherein said insert is arrow shaped in cross-section and the cutting edge extends downwardly from an enlarged section of the insert, said sealing surfaces being a pair of convex surfaces extending away from the cutting edge and connected to portions extending inwardly from ledges formed as a portion of said arrow shape.

19. The insert of claim 15, wherein said second portion is of semicircular cross section the diameter of which is coextensive with the ledges, said sealing surfaces thereby being convex surfaces.

* * * * *